United States Patent [19]

Manna

[11] 4,328,719
[45] May 11, 1982

[54] MICROMOTION MULTIPLIER

[75] Inventor: Albert Manna, Aurora, Ill.

[73] Assignee: Caterpillar Tractor Co., Peoria, Ill.

[21] Appl. No.: 206,191

[22] PCT Filed: Mar. 18, 1980

[86] PCT. No. PCT/US80/00291

§ 371 Date: Mar. 18, 1980

§ 102(e) Date: Mar. 18, 1980

[87] PCT Pub. No.: WO81/02710

PCT Pub. Date: Oct. 1, 1981

[51] Int. Cl.³ .................... B60K 41/00; A01B 63/112
[52] U.S. Cl. ........................................ 74/845; 74/844; 74/857; 172/3; 172/12; 172/430
[58] Field of Search ................ 74/844, 845, 857; 180/335, 290; 172/2, 3, 12, 430, 7

[56] References Cited

U.S. PATENT DOCUMENTS

| | | | |
|---|---|---|---|
| 1,168,179 | 1/1916 | Douglas | 180/290 X |
| 1,168,370 | 1/1916 | Anderson | 180/290 |
| 1,206,953 | 12/1916 | Wales | 180/290 |
| 1,227,504 | 5/1917 | Troll | 180/290 |
| 2,163,108 | 6/1939 | Smith | 180/335 X |
| 2,704,132 | 3/1955 | Marco | 180/290 |
| 3,024,859 | 3/1962 | Marindin | 180/14.5 |
| 3,251,422 | 5/1966 | Allgaier et al. | 172/3 X |

FOREIGN PATENT DOCUMENTS 1425931 2/1976 United Kingdom ................ 180/290

Primary Examiner—Leslie Braun
Attorney, Agent, or Firm—Wegner, Stellman, McCord, Wood & Dalton

[57] ABSTRACT

Apparatus (19) for sensing forces (29) such as in a power transmission apparatus (10) and magnifying the sensed forces suitably to provide an output (28) such as for use in controlling associated equipment (12, 18) to limit the forces. The sensing apparatus (19) includes a flexible beam (30) having a first portion (34) which is fixedly retained as to a fixed portion (23, 24) of the wall member defining the deflectible portion (22). Beam (30) further includes a second portion (33) which is connected to a deflectible wall portion (22) of the wall member (21) which is deflected as a function of force transmission through the apparatus. The flexible beam (30) is provided with a distal arm (31) which is swung by the deflection of the beam to provide an output signal (28) at the distal end (32) of the arm so as to provide a preselected magnification of the deflection of the deflectible wall portion (22). A stabilizer (57) is provided for stabilizing movement of the arm (31) by the deflectible beam (30).

17 Claims, 3 Drawing Figures

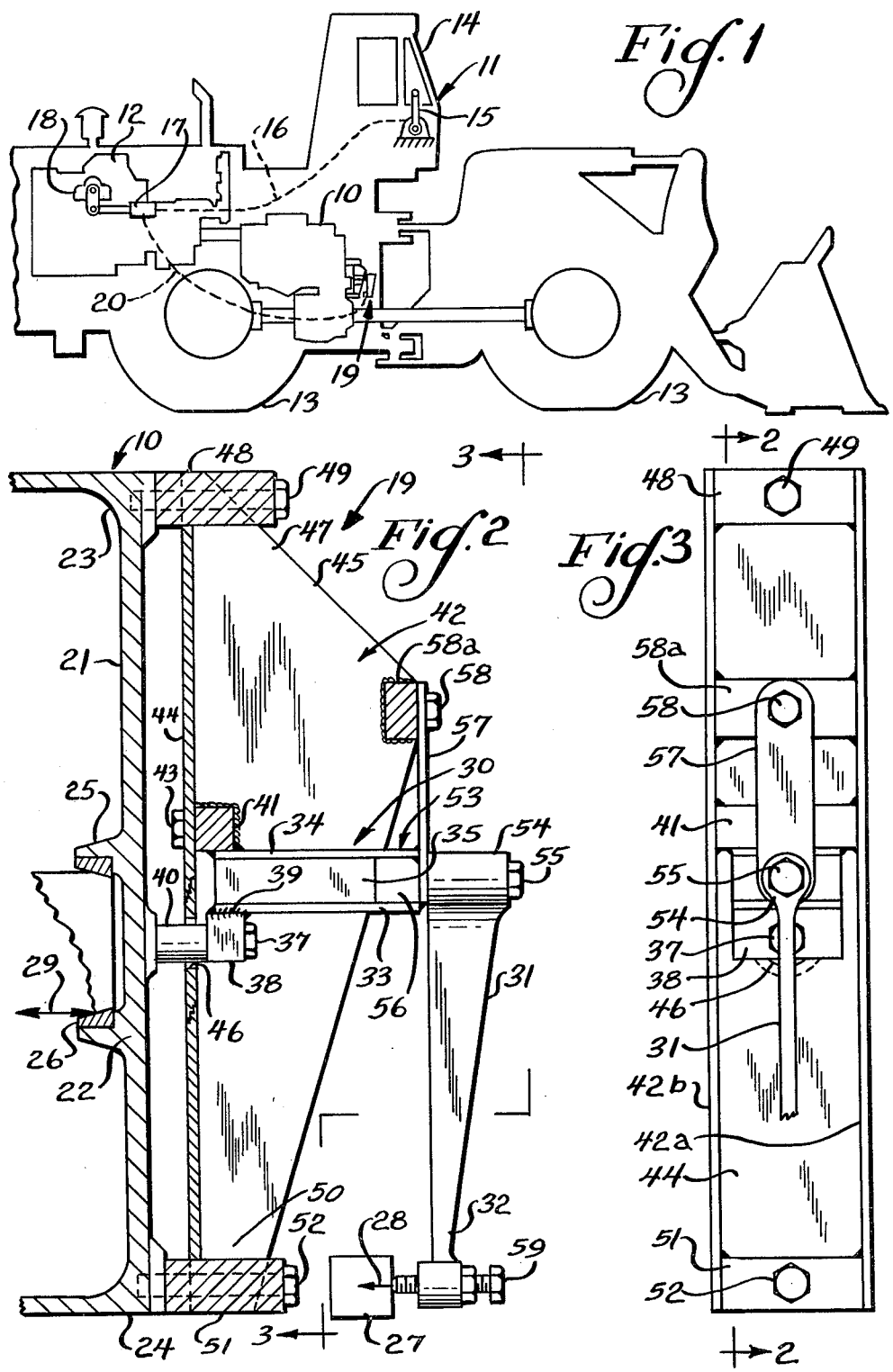

MICROMOTION MULTIPLIER

DESCRIPTION

Technical Field

This invention relates to power transmissions and in particular to means for sensing forces developed in such power transmissions.

Background Art

In power transmissions such as used in earth-working vehicles, substantial forces are developed in the low gear operation thereof. In such operation, it is possible to apply sufficient torque through the transmission so as to possibly damage the transmission under certain operating conditions.

Disclosure of Invention

The present invention comprehends an improved means for sensing such a high torque condition in the transmission, such as for use in limiting the drive force.

More specifically, the invention comprehends means responsive to a strain developed in a portion of the power transmission, including means for amplifying the sensed signal for improved control functioning.

In the illustrated embodiment, the invention is utilized with a power transmission apparatus having a power transfer element and a slightly deflectible support for the power transfer element. The invention includes a flexible beam having a first portion and a second portion, means for fixing the first portion, means for moving the second portion to deflect the beam as a function of deflection of the support as a result of power transfer by the element, an arm, connecting means connecting the arm to the flexible beam to define a motion multiplier wherein a portion of the arm spaced from the connecting means is moved as a multiple of the deflection of the deflectible support, and a motion responsive control means operated by the arm portion.

The flexible beam portions may comprise movably associated, substantially rigid portions. In the illustrated embodiment, the rigid portions are connected by a resilient element.

The apparatus further includes a yieldable stabilizing means connected between a fixed support and the flexible beam for yieldably resisting movement of the connecting means.

In the illustrated embodiment, the support may comprise a portion of the housing of the transmission with the portion of the transmission deflecting the support comprising a bearing thereof.

In the illustrated embodiment, the flexible beam comprises a pair of elongated rigid elements and means for maintaining the elements in side-by-side relationship while permitting relative longitudinal movement therebetween. The connecting means may be disposed at one end of the pair of elements and the fixing means may be disposed at the opposite end of the elements.

The stabilizing means may comprise a flexible plate extending flatwise transversely to the longitudinal extent of the flexible beam. The plate includes a fixed portion and a portion connected to the extension element.

In the illustrated embodiment, the second portion of the flexible beam is connected to the wall member defining the bearing support intermediate fixed portions thereof to which the first portion of the flexible beam is connected.

Thus, in broad aspect, the invention comprehends an improved force sensing means having a flexible beam connected to a rigid beam for movement of the rigid beam in response to movement of the flexible beam in magnifying relationship. The flexible beam is moved in response to forces developed by the power transmission and the magnified output of the apparatus may be utilized for controlling the power input to the transmission. The apparatus of the present invention is extremely simple and economical of construction while yet providing the highly desirable features discussed above.

Brief Description of the Drawing

FIG. 1 is a side elevation of a vehicle having a power transmission sensing and control means embodying the invention;

FIG. 2 is a fragmentary enlarged vertical section illustrating the force sensing and control means in greater detail; and FIG. 3 is a vertical section taken substantially along the line 3—3 of FIG. 2.

Best Mode for Carrying Out the Invention

In the illustrated embodiment of the invention as disclosed in the drawing, a power transmission apparatus 10 is shown as used in a vehicle generally designated 11 having an engine 12 and driven wheels 13. The vehicle may be provided with an operator's cab 14 in which is provided a suitable throttle control 15 for manipulation by the operator of the vehicle. The throttle may be connected through suitable connections 16, including a lost motion connector 17 to the governor 18 of the engine.

The present invention is directed to an improved apparatus 19 responsive to a force, such as torque, developed in the power transmission 10 for automatically limiting the amount of power delivered through the transmission 10 to avoid damage thereto, such as when the vehicle is being operated in low gear and encounters an obstruction. In the illustrated embodiment, the apparatus 19 may be connected through a connection 20 to the lost motion connector 17 so as to vary the effect of movement of the throttle 15 suitably to effect the desired limitation of power transmission.

Apparatus 19 is more specifically illustrated in FIGS. 2 and 3. As shown therein, the apparatus may be mounted to a portion of the power transmission 10 in such a manner as to sense torque loads developed therein. In the illustrated embodiment, the apparatus 19 is mounted to the housing 21 of the transmission, and more specifically, is mounted to three portions of housing including a deflectible portion 22 and a pair of fixed portions 23 and 24. The deflectible portion illustratively defines a boss 25 carrying a bearing 26 comprising a portion of the drive train of the transmission. In the normal operation of the transmission 10, the deflectible wall portion 22 is deflected as a function of the amount of torque being transmitted through the transmission 10, causing the bearing 26 to move slightly axially and thereby correspondingly slightly deflect the deflectible wall portion 22 as a direct function of the transmitted torque. Fixed portions 23 and 24 may comprise any suitable effectively stationary portions of the housing, preferably adjacent the deflectible portion 22, as illustrated in FIG. 2.

The amount of deflection of wall portion 22 is relatively small and it is a function of apparatus 19 to magnify this small deflection so as to provide a suitable output signal, such as for controlling the lost motion connector 17, as discussed above. As illustrated in FIG. 2, the output signal may be delivered to a suitable output device 27 which may comprise a connector at one end of the connection 20, a suitable control switch, etc. In the illustration of FIG. 2, the output signal 28, as discussed above, is a multiple of the input deflection signal 29 developed through bearing 26.

More specifically, apparatus 19 includes a deflectible beam 30 carrying a rigid beam 31 which effectively defines an extension arm extending perpendicularly to the flexible beam so that a distal portion 32 of the stiff beam arm has a magnified movement proportional to the deflection of the flexible beam 30. As best seen in FIG. 2, the flexible beam includes a pair of rigid, elongated elements 33 and 34 movably interconnected by a resilient connecting portion 35. Rigid element 33 is fixedly connected to the deflectible wall portion 22 by means of a bolt 37 extending through a collar 38 secured to the plate 33 as by a weld 39. The bolt is threaded into a tubular post 40 secured to the deflectible wall portion 22, whereby the elongated element 33 moves longitudinally directly with the movement of the deflectible portion 22 by the forces 29.

Rigid element 34 is fixedly retained as by welding to a block 41 secured to a crossplate 44 of a rigid box girder beam generally designated 42 by a bolt 43. The rigid box beam 42 includes a pair of generally triangular sideplates 42a and 42b and a crossplate 44 welded between the rear edges of the sideplates. The crossplate portion may be provided with a suitable opening 46 through which the post 40 is free to move.

One end 47 of the rigid beam 42 is connected to fixed portion 23 of housing 21 by a mounting block 48 welded between plates 42a and 42b and through which a suitable bolt 49 is extended threaded to the housing portion 23. The opposite end portion 50 of the rigid beam 42 is connected to the stationary portion 24 of the housing by a similar mounting block 51 welded between plates 42a and 42b and through which a bolt 52 is extended threaded to the housing portion 24. Thus, deflectible beam portion 34 is fixedly retained at all times notwithstanding longitudinal movement of beam portion 33, as discussed above.

As further discussed above, the rigid elements 33 and 34 of the flexible beam may be interconnected by a suitable resilient element 35, which, in the illustrated embodiment, comprises a block of rubber adhesively bonded to the elements 33 and 34, as shown in FIGS. 2 and 3.

Rigid beam 31 is connected to the distal end 53 of the deflectible beam 30 by means of a collar 54 on beam 31 and a bolt 55 extending through the collar and threadedly connected to a rigid block 56 welded between the distal end portions of the elements 33 and 34.

Movement of arm 31 is stabilized by a thin plate stabilizer 57 having one end secured to the stiffener 45 of rigid beam 42 by a suitable bolt 58. The distal end of the stabilizer plate may be welded to the distal end of the elements 33 and 34, as shown in FIG. 2, or alternatively, merely clamped between collar 54 and the distal end 53 of the flexible beam by the bolt 55, as desired.

Thus, the stabilizing means effectively comprises a resilient element defined by the flexible plate for further controlling the amount of swinging of the arm 31 as a result of the deflection of beam 30 which, in turn, is a result of the longitudinal movement of movable plate 33 relative to fixed plate 34 caused by the forces 29 acting on the housing deflectible portion 22.

Industrial Applicability

The sensing apparatus 19 is adapted for use in a wide range of applications where sensing of excessive forces developed in a portion of an apparatus is a desideratum. The invention, as indicated above, is illustrated in connection with an earthworking vehicle wherein substantial forces may be developed in the power transmission 10 which, at times, may tend to be excessive. The invention comprehends providing a motion-responsive control means which magnifies a small deflection of a portion of the power transmission means so as to provide a suitable signal for suitable use in limiting the applied force.

Thus, as discussed above, the invention more specifically utilizes a deflection of a housing portion of the power transmission as an input signal to a deflectible beam which carries an arm in such a manner as to permit the distal end of the arm to have a magnified movement suitable for operating a motion-responsive control to effect the desired force limitation.

In the illustrated embodiment, the deflection of the housing portion 22 suitably deflects beam 30 by movement of rigid portion 33 thereof relative to fixed portion 34, thereby swinging the rigid arm 31 at the outer end of the flexible beam.

The stabilizer 57 provides an improved stabilization of the movement of arm 31.

As shown in FIG. 2, arm portion 32 may be provided with an adjustable screw 59 for adjusting the application of the output signal 28 to the motion-responsive control connector 27.

As apparatus 19 is secured to the power transmission housing 21 by bolts 37, 49 and 52, the apparatus may be readily installed and removed from the housing, as desired. Similarly, different apparatuses 19 may be utilized having different stiffness characteristics so as to provide a wide range of deflection magnifications as desired.

While the invention has been disclosed in connection with a power transmission force transmitting means, and more specifically in connection with a force sensing means mounted to a housing portion thereof, as will be obvious to those skilled in the art, the apparatus 19 may be satisfactorily utilized with a wide range of different force transmitting structures wherein at least one portion thereof is deflectible as a result of the force transmission and another portion thereof is maintained fixed, permitting suitable connection of the apparatus 19 to the deflectible and fixed portions to provide the desired bending of the flexible beam 30 and swinging of the rigid arm 31 in the manner discussed above.

Other aspects, objects and advantages of the invention can be obtained from a study of the drawings, the disclosure and the appended claims. The foregoing disclosure of specific embodiments is illustrative of the broad inventive concepts comprehended by the invention.

I claim:

1. In a power transmission apparatus (10) having a power transfer element (26) and a slightly deflectible support (22) for said power transmission element (26), the improvement comprising:

a flexible beam (30) having a first portion (34) and a second portion (33);

means (41,42,43,48,49) for fixing said first portion;

means (37,38,39,40) for moving said second portion to deflect said beam as a function of deflection of said support (22) as a result of power transfer by said apparatus (10);

an arm (31);

connecting means (54,55,56) connecting said arm (31) to said flexible beam (30) to define a motion multiplier wherein a portion (32) of said arm (31) spaced from said connecting means (54,55,56) is moved as a multiple of deflection of said deflectible support (22); and a motion-responsive control means (27) operated by said arm portion (32).

2. The power transmission apparatus (10) of claim 1 wherein said flexible beam portions (33,34) comprise movably associated, substantially rigid portions.

3. The power transmission apparatus (10) of claim 1 wherein said flexible beam (30) includes means (35) movably associating said first (34) and second (33) portions, and said first and second portions (34, 33) comprise substantially inextensible portions.

4. The power transmission apparatus (10) of claim 1 wherein said flexible beam (30) comprises a first rigid element (34) defining said first portion, a second rigid element (33) defining said second portion, and a resilient element (35) connecting said rigid elements.

5. The power transmission apparatus (10) of claim 1 further including yieldable stabilizing means (57) connected between a fixed support (23) and said flexible beam (30) for yieldably resisting movement of said connecting means (54,55,56).

6. The power transmission apparatus (10) of claim 1 further including yieldable stabilizing means (57) connected between a fixed support (23) and said flexible beam (30) adjacent said connecting means (54,55,56) for yieldably resisting movement of said arm (31).

7. In an apparatus having a rotatable power transfer means (10) provided with a bearing (26) mounted to a deflectible support (22), the improvement comprising:

a flexible beam (30) having a first portion (34) and a second portion (33);

means (41,42,43,48,49) for fixing said first portion;

means (37,38,39,40) for connecting said second portion (33) to said deflectible support (22) to deflect said beam (30) as a function of deflection of said support (22) as a result of power transfer by said power transfer means;

an extension element (31);

connecting means (54,55,56) connecting said extension element (31) to said flexible beam (30) to define a motion multiplier wherein a portion (32) of said extension element (31) spaced from said connecting means (54,55,56) is moved as a multiple of the deflection of said deflectible support (22) by forces applied to said bearing (26) by the power transfer means (10); and a motion responsive control means operated by said extension element portion (32).

8. The apparatus of claim 7 wherein said flexible beam (30) comprises a pair of elongated elements (34,33) defining said first and second portions, and means (35) for maintaining said elements in side-by-side relationship while permitting relative longitudinal movement therebetween.

9. The apparatus of claim 7 wherein said flexible beam (30) comprises a pair of elongated elements (34,33) defining said first and second portions, and means (35) for maintaining said elements in side-by-side relationship while permitting relative longitudinal movement therebetween, said connecting means (54,55,56) being disposed at one end of said pair of elements (34,33).

10. The apparatus of claim 7 wherein said flexible beam (30) comprises a pair of elongated elements (34,33) defining said first and second portions, and means (35) for maintaining said elements in side-by-side relationship while permitting relative longitudinal movement therebetween, said connecting means (54,55,56) being disposed at one end of said pair of elements (34,33), said fixing means (41,42,43,44) being disposed at the opposite end of the element (34) defining said first portion.

11. The apparatus of claim 7 wherein said flexible beam (30) comprises a pair of elongated elements (34,33) defining said first and second portions, and means (35) for maintaining said elements in side-by-side relationship while permitting relative longitudinal movement therebetween, said connecting means (54,55,56) being disposed at one end of said pair of elements (34,33), said connecting means (37,38,39,40) comprising means connecting the opposite end of the element (33) defining said second portion to said deflectible support (22).

12. The apparatus of claim 7 further including stabilizing means (57) for yieldably resisting movement of said extension element (31).

13. The apparatus of claim 7 further including stabilizing means (57) for yieldably resisting movement of said extension element (31), said stabilizing means (57) comprising a flexible plate extending flatwise transversely to the longitudinal extent of said flexible beam (30), said plate having a fixed portion and a portion connected to said extension element (31).

14. The apparatus of claim 7 wherein said deflectible support (22) comprises a wall member (21) having a fixed portion (23,24), said first portion (34) of the deflectible beam (30) being connected to said fixed portion of the wall member (21).

15. The apparatus of claim 7 wherein said deflectible support (22) comprises a wall member (21) having a fixed portion (23,24), said stabilizing means (57) comprising a resilient element connected between said fixed portion (23,24) of the wall member (21) and said extension element (31).

16. The apparatus of claim 7 wherein said deflectible support (22) comprises a wall member (21) having a plurality of fixed portions (23,24), said first portion (34) of the deflectible beam (30) being connected to at least two of said fixed portions (23, 24) of the wall member (21).

17. The apparatus of claim 7 wherein said deflectible support (22) comprises a wall member (21) having a plurality of fixed portions (23,24), said first portion (34) of the deflectible beam (30) being connected to at least two of said fixed portions (23, 24) of the wall member (21), said second portion (33) of the flexible beam (30) being connected to the wall member (21) intermediate the fixed portions (23,24) thereof to which the first portion (34) of the flexible beam (30) is connected.

* * * * *